May 16, 1939.　　　　A. S. KNAPP　　　　2,158,460
CORN POPPER
Filed June 9, 1937　　　2 Sheets-Sheet 1
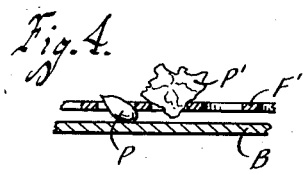
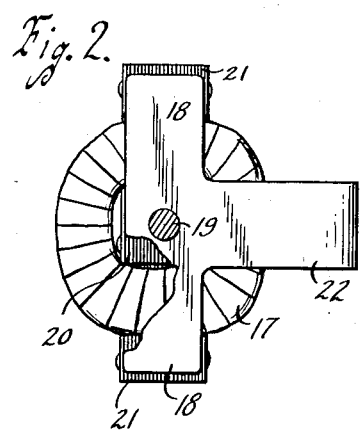
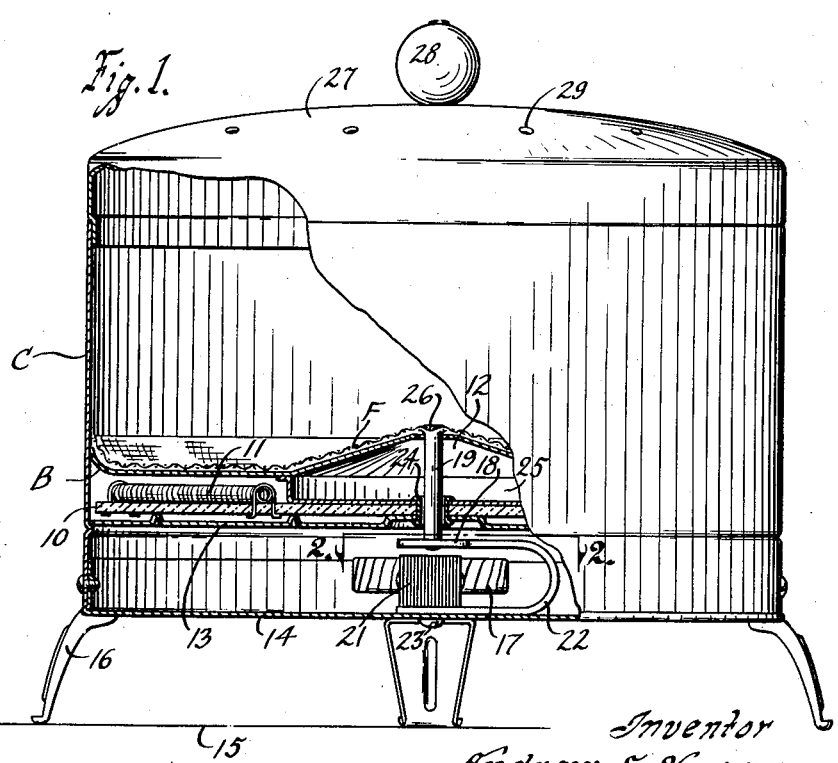
Witness
H. S. Munzenmaier
Inventor
Andrew S. Knapp
by Bair & Freeman
Attorneys

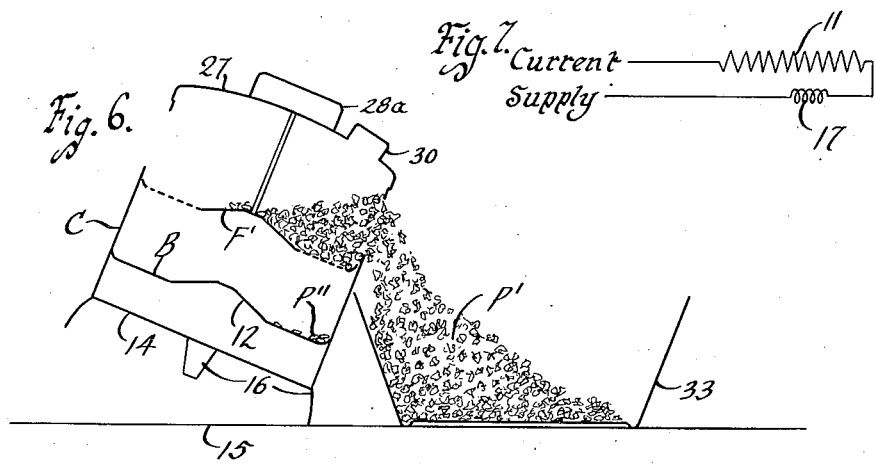
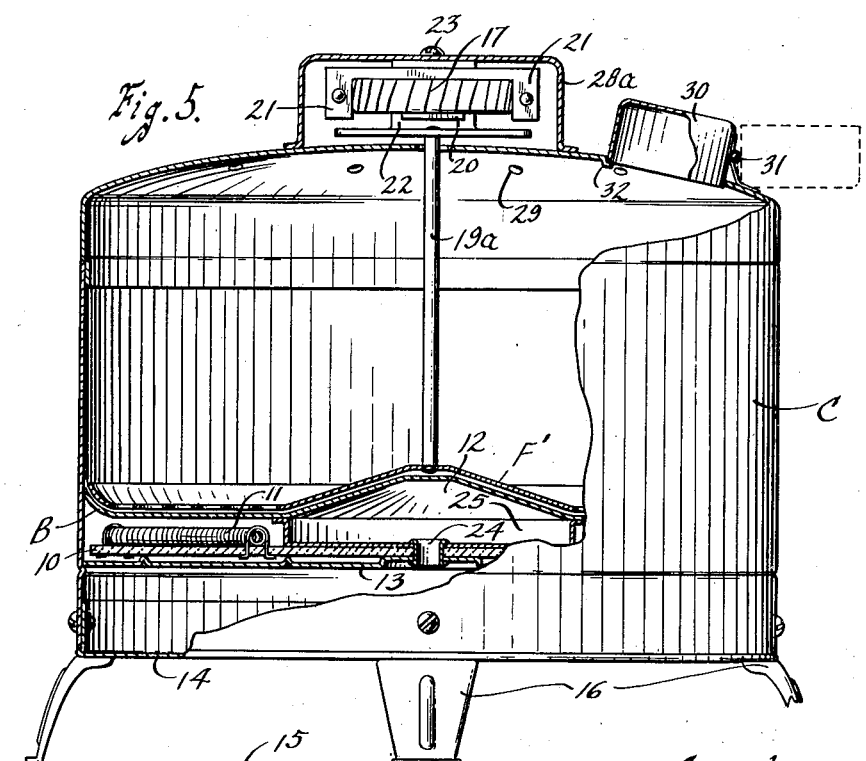

Patented May 16, 1939

2,158,460

UNITED STATES PATENT OFFICE 2,158,460

CORN POPPER

Andrew S. Knapp, St. Louis, Mo., assignor to Knapp-Monarch Company, St. Louis, Mo., a corporation of Missouri Application June 9, 1937, Serial No. 147,268

18 Claims. (Cl. 53—4)

One object of my invention is to provide a corn popper which is simple, durable and comparatively inexpensive to manufacture.

Another object is to provide a corn popper in which means is provided for effectively agitating the popcorn to keep it from burning without, however, undesirably agitating the entire popper.

Still another object is to provide a corn popper including a bottom member and an agitator for the popcorn which comprises a perforated false bottom closely adjacent the bottom member, means being provided to vibrate the false bottom for thus agitating the popcorn in the popper.

A further object is to provide the false bottom with perforations of sufficient size to permit unpopped corn when resting thereon to at least partially extend through said false bottom and contact with the bottom member to be heated and popped thereby without resting entirely thereon.

A further object is to provide such a perforated false bottom, which, due to the size of the perforations, effectively agitates the popcorn and at the same time supports the corn when popped and permits the kernels which will not pop to pass therethrough for separating them from the popped kernels.

Still a further object is to mount the false bottom so that it can be moved upwardly relative to the bottom member for the purpose of extracting the popped corn from the casing after the popping operation has been completed.

Still a further object is to provide agitating means for the false bottom which may, in one form of the invention, be mounted below the bottom member or, in another form thereof, may be mounted above it and carried by the cover for the casing. The vibrating means is preferably electrically operated and heating means is provided for the popper which is also preferably electrically operated.

With these and other objects in view, my invention consists in the construction, arrangement and combination of the various parts of my corn popper, whereby the objects contemplated are attained, as hereinafter more fully set forth, pointed out in my claims, and illustrated in the accompanying drawings, in which:

Figure 1 is a side elevation, partly in section, showing a corn popper embodying my invention.

Figure 2 is an enlarged sectional view on the line 2—2 of Figure 1 showing a vibrator means.

Figure 3 is an enlarged sectional view of a wire mesh false bottom showing its relation to the bottom of the popper casing and also illustrating its action.

Figure 4 is a sectional view showing a perforated sheet metal plate substituted for the wire mesh false bottom.

Figure 5 is a side elevation partly in section showing a modified construction in which the vibrating means is mounted on the cover of the corn popper instead of in the base thereof.

Figure 6 is a diagrammatic sectional view showing the popped corn extracting operation for the form of invention shown in Figure 5.

Figure 7 is an electrodiagrammatic view of the circuit arrangement for the heating element and vibrator of the popper.

On the accompanying drawings, I have used the reference character C to indicate a casing. The casing C may be cylindrical and is provided with a bottom member B.

A heating element is provided for the bottom member B and may comprise a base 10 of insulating material and a resistance wire 11 suitably mounted thereon and shaped to substantially directly heat the entire bottom member B with the exception of a cone-shape portion 12 thereof. The base 10 is supported on a second bottom member 13 below which is a third bottom member 14. The bottom members 13 and 14 serve to aid in reflecting the heat of the resistance element 11 toward the bottom member B and to minimize radiation of the heat toward a table top 15 or other supporting surface. Supporting legs 16 are provided for the casing C.

A false bottom F is provided which comprises wire mesh of the proper size to permit unpopped corn indicated at P in Figure 3 to pass therethrough. The false bottom F, however, is positioned sufficiently close to the bottom member B to permit the popped corn P to extend only partially through the mesh of the false bottom F. This permits the corn P to contact with the bottom member B so that it will be heated and popped thereby, but after being popped as illustrated at P', its increase in size will cause it to be supported by the false bottom F. Similarly a false bottom F' as shown in Figure 4 formed of perforated sheet metal may be used instead of the wire mesh, the perforations being of the proper size to secure the results desired as above outlined.

Obviously if means is provided for moving or vibrating the false bottom F or F', the popcorn will be sufficiently agitated to prevent any one point of each kernel from remaining in the same relative position to the heated bottom member B and thereby the popcorn will be properly heated and popped by the bottom member without any possibility of burning the kernels if the corn popping operation is continued for only the necessary time to pop all of the kernels which are capable of being popped in a reasonable period of time.

In Figure 1, I illustrate a vibrating means for the false bottom F comprising an electromagnet having a coil 17 to be energized by alternating current, an armature 18 to be vibrated thereby and a stem 19 to serve as an operative connection between the armature 18 and the false bottom F.

The coil 17 is wound on a central leg 20 of a laminated core member. The core member has a pair of end legs 21 in addition to the central leg 20. The legs 20, 21 and 21 cooperate with the armature 18 to exert intermittent pull thereon when the coil 17 is energized either by alternating current or an interrupted current. The armature 18 is part of a U-shaped bracket 22, the other end of which is secured to the base of the core member at the center pole 20 thereof as by a screw 23 (see Figure 1). The screw 23, also serves to mount the vibrator relative to the third bottom member 14.

The stem 19 extends through a sleeve 24 which in turn extends through the second bottom member 13, the heating element base 10 and a spacer disc 25 having a peripheral spacer flange. The upper end of the stem 19 is connected to the false bottom F by soldering or brazing it thereto as indicated at 26.

A cover 27 is provided for the casing C. A knob 28 is provided on the cover 27 for convenience in opening and closing the corn popper. The cover 27 may be provided with perforations 29 to permit the escape of vapors from the casing C.

In Figure 5, I show a modified construction in which the vibrator, instead of being mounted on the bottom member 14, is mounted on the cover 27. A knob member 28a is provided which serves as a support for the vibrator. The vibrator has an elongated stem 19a depending therefrom and connected to the false bottom which in this figure is illustrated as of sheet metal and bears the reference character F'. The false bottom F' when supported from the vibrator in this manner is capable of movement upwardly relative to the casing C.

In connection with the cover member 27, a combined filler cap and measuring cup 30 may be provided. It is hinged to the cover member 27 as indicated at 31 so that when opened as shown in dotted lines, it is adapted to receive a predetermined quantity or charge of unpopped corn. When it is swung to the closed position against a stop lug 32, the corn is discharge into the casing C and falls onto the false bottom F'.

As shown in Figure 7, the resistance element 11 and the vibrator coil 17 may be connected in series. This is not necessary, however, as they may be so designed that they may be connected in parallel. In either case it is desirable to simultaneously energize the heating element and the vibrating coil.

*Practical operation*

In the use of the corn popper shown in Figure 1, a desired quantity of unpopped corn is placed in the casing C on the false bottom F. The heating element and vibrator will be energized by connection to a suitable source of current supply. When such source is of alternating character, the vibrator will operate properly while if it is direct current, then a suitable interrupter mechanism should be used for intermittently energizing the vibrator coil.

During the popping of the corn, the unpopped kernels will be agitated to keep them from burning. As soon as they are popped their increase in size will lift them above the heated bottom B as shown at P' in Figures 3 and 4, thus insuring that neither the popped nor the unpopped corn will be burned. At the completion of the popping operation, the popper may be opened and the popped corn extracted.

With the arrangement of the vibrator shown in Figure 5, the operation is similar with the addition that at the completion of the popping operation, the knob 28a may be grasped for opening the cover 27 and also moving the false bottom F' upwardly to extract the popped corn P' as illustrated in Figure 6, the popper casing being tipped for this purpose. A pan 33 is illustrated as receiving the popped corn. The unpopped kernels of corn are indicated at P''. Thus the unpopped kernels are separated from the popped kernels and after the popped kernels are extracted, the unpopped kernels are or can be discarded.

Some changes may be made in the construction and arrangement of the various parts of my corn popper, without departing from the real spirit and purpose of my invention, and it is my intention to cover by my claims, any modified forms of structure or use of mechanical equivalents, which may be reasonably included within their scope.

I claim as my invention:

1. In a corn popper, a casing having a cylindrical upright wall and a bottom member adapted to be heated, a false bottom in said casing movably mounted relative to the bottom member for supporting and agitating the unpopped corn, said false bottom having perforations of sufficient size to permit said unpopped corn positioned on said false bottom to at least partially extend therethrough, said false bottom being spaced from said bottom member a distance less than the minimum dimension of a kernel of corn so that the extending portions of the unpopped corn kernels contact with said bottom member and the major portions thereof remain above the false bottom, and means for heating said bottom member.

2. In a corn popper, a casing having a wall and a bottom member, a false bottom in said casing, said false bottom having perforations of sufficient size to permit unpopped corn, when resting on said false bottom, to at least partially extend through said false bottom, said false bottom being positioned relative to said bottom member so that the extending portions of the unpopped corn contact with said bottom member, means for heating said bottom member and means for rapidly varying the position of said false bottom to and away from said bottom member for agitating the corn.

3. A corn popper structure comprising a casing including a bottom member, a false bottom therein, said false bottom having perforations of sufficient size to permit unpopped corn, when resting thereon, to partially extend through said false bottom, said perforations being small enough so that said corn when popped is supported by said false bottom, said false bottom being positioned adjacent said bottom member so that the extending portions of the unpopped corn contact with said bottom member, means for heating said bottom member and means for moving said false bottom to and away from said bottom member for agitating the corn.

4. A corn popper structure comprising a casing including a bottom member, a false bottom thereabove, said false bottom being perforated and being positioned closely adjacent said bottom member, means for heating said bottom member and means for moving said false bottom to and away from said bottom member to agitate kernels of pop corn deposited on said false bottom.

5. A corn popper structure comprising a casing including a stationary bottom member having a flat portion, a false bottom thereabove parallel with said flat portion and movable with respect thereto, said false bottom having perforations therein and being positioned closely adjacent said bottom member, and means for heating said bottom member.

6. A corn popper structure comprising a casing including a bottom member, a false bottom thereabove, said false bottom being perforated and being positioned closely adjacent said bottom member, means for heating said bottom member and means for vibrating said false bottom.

7. A corn popper structure comprising a casing including a bottom member, a false bottom thereabove, said false bottom having perforations therein and being positioned closely adjacent said bottom member, and means for simultaneously heating said bottom member and vibrating said false bottom.

8. A corn popper structure comprising a casing including a bottom member, a false bottom thereadjacent, means for heating said bottom member and means for moving said false bottom relative to said bottom member operable by an electric circuit and adapted to maintain movement of the false bottom whenever the heat is applied.

9. A corn popper structure comprising a casing including a bottom member, a perforated false bottom thereadjacent, and electrical means for heating said bottom member and electrically operated means for vibrating said false bottom relative thereto to agitate the pop corn deposited on said false bottom.

10. A corn popper structure comprising a casing including a bottom member, a perforated false bottom positioned closely adjacent said bottom member, means for heating said bottom member and means extending to the exterior of such structure for extracting said false bottom from said casing to extract the popped corn therefrom.

11. A corn popper structure comprising a casing including a bottom member, a perforated false bottom positioned closely adjacent said bottom member, means for heating said bottom member, means for vibrating said false bottom and means for moving said false bottom outwardly relative to said casing to expel the popped corn from the casing.

12. A corn popper comprising a casing having a bottom member, a false bottom therein formed of perforated sheet metal, said false bottom being positioned closely adjacent said bottom member, means for heating said bottom member, and means for vibrating said false bottom.

13. A corn popper comprising a casing having a bottom member, a false bottom therein formed of wire mesh, said false bottom being positioned closely adjacent said bottom member, means for heating said bottom member, and means for vibrating said false bottom.

14. A corn popper comprising a casing including a bottom member, a perforated false bottom adjacent said bottom member, a vibrator for said false bottom, said vibrator being located below said bottom member and having a connection with said false bottom extending through said bottom member, and means for heating said bottom member.

15. A corn popper comprising a casing including a bottom member, a perforated false bottom adjacent said bottom member, a vibrator for said false bottom, means for heating said bottom member and a cover for said casing, said vibrator being mounted on said cover and having a depending connection with said false bottom.

16. A corn popper comprising a casing including a bottom member, a perforated false bottom in said casing, a vibrator for said false bottom, means for heating said bottom member, a removable cover for said casing, said vibrator being carried by said cover and having a connecting element depending therefrom, the said connecting element being operatively connected with said false bottom.

17. A corn popper comprising a casing including a bottom member, means for heating said bottom member, a cover for said casing, a closure device for said cover, said closure device being inverted, cup-shaped and hinged to the cover so that in its opened position it serves as a measure for for unpopped corn, a false bottom in said casing adjacent said bottom member, said false bottom being perforated, and means for moving said false bottom relative to said bottom member to agitate the corn in the popper.

18. In a corn popper a casing having a wall and bottom, a false bottom in said casing movably mounted relative to the bottom having perforations greater in dimension than the minimum dimension of an unpopped kernal of corn and smaller in dimension than a popped kernal of corn, said false bottom being positioned in the casing so that the bottom surface is spaced from the casing bottom a distance less than the minimum dimension of an unpopped kernal of corn.

ANDREW S. KNAPP.